United States Patent
Kaminsky

(10) Patent No.: US 9,584,543 B2
(45) Date of Patent: Feb. 28, 2017

(54) METHOD AND SYSTEM FOR WEB INTEGRITY VALIDATOR

(71) Applicant: BOT or NOT, LLC, Brooklyn, NY (US)

(72) Inventor: Daniel Kaminsky, San Francisco, CA (US)

(73) Assignee: WHITE OPS, INC., Brooklyn, NY (US)

( * ) Notice: Subject to any disclaimer, the term of this patent is extended or adjusted under 35 U.S.C. 154(b) by 0 days.

(21) Appl. No.: 14/198,537

(22) Filed: Mar. 5, 2014

(65) Prior Publication Data

US 2015/0256556 A1    Sep. 10, 2015

Related U.S. Application Data

(63) Continuation-in-part of application No. 14/093,964, filed on Dec. 2, 2013.

(Continued)

(51) Int. Cl.
*H04L 29/06* (2006.01)
*G06F 21/31* (2013.01)
(Continued)

(52) U.S. Cl.
CPC ........ *H04L 63/168* (2013.01); *H04L 63/1408* (2013.01); *G06F 21/31* (2013.01);
(Continued)

(58) Field of Classification Search
CPC ..... H04L 63/08; H04L 63/145; H04L 63/105; H04L 63/1483; H04L 63/1466; H04L 63/1416; H04L 67/02; H04L 63/1425; G06F 21/566; G06F 2221/2133; G06F 21/31; H04W 12/06

USPC ......................................................... 726/23
See application file for complete search history.

(56) References Cited

U.S. PATENT DOCUMENTS

| | | | |
|---|---|---|---|
| 2005/0210275 A1* | 9/2005 | Homing | G06F 21/14 713/190 |
| 2009/0077383 A1* | 3/2009 | de Monseignat et al. | 713/175 |
| 2009/0187763 A1* | 7/2009 | Freericks et al. | 713/167 |
| 2009/0292984 A1* | 11/2009 | Bauchot | G06F 17/30896 715/234 |

(Continued)

FOREIGN PATENT DOCUMENTS

WO    WO 2012/0732233    *  6/2012

*Primary Examiner* — Michael Simitoski
*Assistant Examiner* — Gary Lavelle
(74) *Attorney, Agent, or Firm* — Nadya Reingand; Yan Hankin

(57) ABSTRACT

A computer-implemented method and system for the validation of a true browsing user on a website is disclosed. The invention allows for the collection of data regarding the evolving threat landscape created by online attackers. The system and method fingerprint user behavior to detect differences between a local user, a remote/foreign user, and an automated script. The system then covertly transmits that information back to a financial institution client without giving online attackers the opportunity to notice such transmittal. Certain embodiments of the invention also correspond with the browsing user to validate their identity. The claimed system and method proactively reveal attackers and attack ploys, additionally enabling institutions and security consultants to adapt to attacks in an automated fashion.

20 Claims, 1 Drawing Sheet

Related U.S. Application Data

(60) Provisional application No. 61/773,106, filed on Mar. 5, 2013.

(51) Int. Cl.
  *H04W 12/06* (2009.01)
  *G06F 21/56* (2013.01)
  *H04L 29/08* (2006.01)

(52) U.S. Cl.
  CPC .... *G06F 21/566* (2013.01); *G06F 2221/2133* (2013.01); *H04L 63/08* (2013.01); *H04L 63/105* (2013.01); *H04L 63/145* (2013.01); *H04L 63/1416* (2013.01); *H04L 63/1425* (2013.01); *H04L 63/1466* (2013.01); *H04L 63/1483* (2013.01); *H04L 67/02* (2013.01); *H04W 12/06* (2013.01)

(56) References Cited

U.S. PATENT DOCUMENTS

| | | | |
|---|---|---|---|
| 2010/0162393 A1* | 6/2010 | Sobel et al. | 726/23 |
| 2012/0084866 A1* | 4/2012 | Stolfo | 726/25 |
| 2012/0291129 A1* | 11/2012 | Shulman et al. | 726/23 |
| 2012/0331550 A1* | 12/2012 | Raj | G06F 21/575 726/22 |
| 2013/0080911 A1* | 3/2013 | Klemm | G06F 17/3089 715/745 |
| 2013/0263023 A1* | 10/2013 | Goodwin | G06F 17/30 715/760 |
| 2014/0317744 A1* | 10/2014 | Turgeman | H04L 63/1408 726/23 |

* cited by examiner

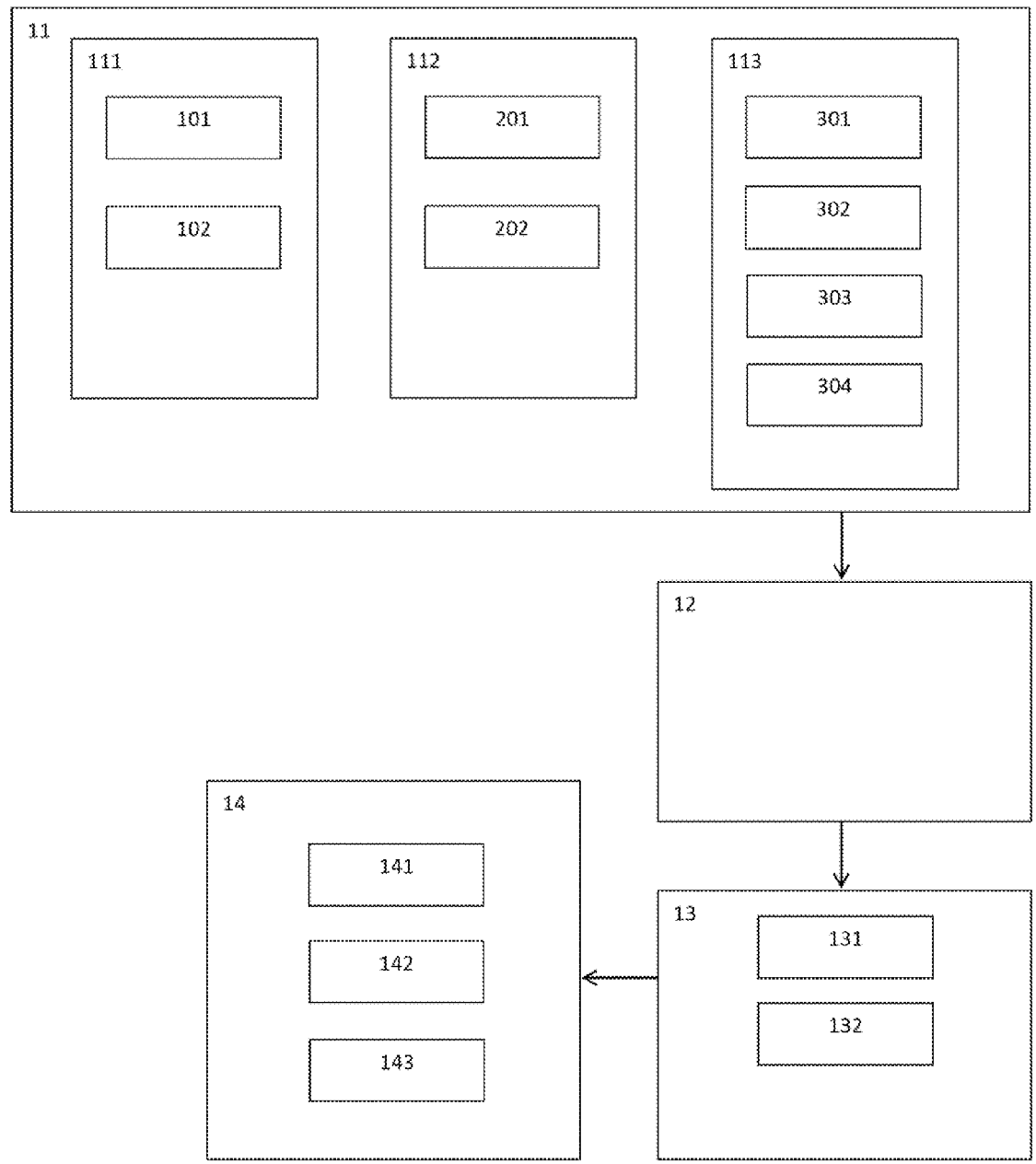

US 9,584,543 B2

METHOD AND SYSTEM FOR WEB INTEGRITY VALIDATOR

CROSS-REFERENCE TO RELATED APPLICATIONS

This patent application claims priority to, and incorporates fully by reference, U.S. Provisional Patent Application No. 61/773,106, filed Mar. 5, 2013. The present application is a continuation-in-part of the U.S. patent application Ser. No. 14/093,964 filed Dec. 2, 2013.

FIELD OF THE INVENTION

The present invention is related to a system and method for network security systems and detecting fraudulent activity on these networks. More particularly, the invention relates to a system and method for verifying the identity of a user, establishing a secure and mutually trusted connection on a public telecommunications network, and compiling data relating to detected activity.

BACKGROUND OF THE INVENTION

Man-in-the-Browser ("MITB") attacks bypass all cryptographic mechanisms against interference, including, but not limited to, passwords, credentials, encryption, and SSL, by taking over the interface between the user (i.e. client) and the website (i.e. server). These attacks cause significant damage and are easy to code and deploy.

Data that leaves a client computer/device is vulnerable to a wide array of attacks, including, but not limited to, unauthorized collection of data, spoofing attacks, sniffing attacks, phishing attacks, password compromises, and attacks against client users and server information repositories. Personal computer users scan for compromises with antivirus applications that are only minimally effective. On the institutional level, risk managers look for abnormal transaction patterns to detect online fraud. Thus, attacks are currently undetectable if they fail to trigger antivirus warnings or abnormal transaction alerts.

A MITB attack circumvents standard user defenses while making it easy for adversaries to automate attacks. MITB attacks, including but not limited to those enabled by the Zeus toolkit, often go further than watching what occurs in browsers. These attacks frequently impersonate the user or alter data before it is displayed to the user. Client defenses currently require individualized surveillance of target machines and comprise eliminating or thwarting attacks only as they are detected.

SUMMARY OF THE INVENTION

A system and method for detecting and deterring fraudulent activity during online transactions and communications is disclosed. The system and method comprise: a fingerprinting mechanism to record information for processing, a mutating mechanism to vary the signal emitted by the system, defensive mechanisms to avoid detection and compromise by the adversary, an interface façade mechanism to further avoid detection, a central database for storing information collected, and an application interface mechanism for the logging and processing of data collected.

BRIEF DESCRIPTION OF THE DRAWINGS

FIG. 1 shows an example of the process employed by the present invention and the interaction between the fingerprinter, mutator, defensive mechanisms, database, maintainer interface, and user interface façade.

DETAILED DESCRIPTION OF THE PREFERRED EMBODIMENT

Definitions

HTML (HyperText Markup Language). The primary programming language used for creating, transmitting and displaying web pages and other information that can be displayed in an Internet browser.

HTTP (Hypertext Transfer Protocol). The standard World Wide Web client-server protocol used for the exchange of information (such as HTML documents, and client requests for such documents) between a Web browser and a Web server. HTTP includes several different types of messages which can be sent from the client to the server to request different types of server actions. For example, a "GET" message, which has the format GET <URL>, causes the server to return the content object located at the specified URL.

Means for detecting. This term includes, but is not limited to, actively inserting a code snippet into a page HTML code before the page is sent to a browser or passive monitoring of otherwise normal behavior. Active insertions of code can be static, meaning that they contain fully the amount of material required to perform a complete analysis according to the present invention. Or active insertions can be dynamic, meaning that they communicate with the detection network to retrieve additional code or description keys, resulting in compilation of additional statistical data. While the below examples speak of active insertion, they should be read to include the possibility of passive monitoring as an alternate means for detection.

Code Snippet. Although the term "snippet" may imply a small portion, this term should not be read as limiting—the amount of code inserted can range in size. The code snippet is modularized, with chunks for elements including, but not limited to, browser DOM analysis, flash timing analysis, mouse event capture, etc. The ability to dynamically mutate a given code snippet allows for correlation of bot types and/or classes with customer financial flows, e.g., by integrating parameters ("analysis dimensions") from a given customer into a given snippet.

Disclosed herein is a Web Integrity Validator ("WIV"), a system in the form of an advanced computer-implemented platform for detecting security threats including, but not limited to, "Man-in-the-Browser" attacks via JavaScript. Applications of the platform include but are not limited to computer software that can be deployed via financial institutions' websites. WIV detects the Zeus family of malware, a toolkit which successfully attacks and daily threatens online transactions between financial institutions and their clients.

The present invention is a system and method for validating the integrity (i.e. validity, safety, or security) of a given website or image displayed on a user's screen. It comprises a universally deployable JavaScript tool to detect changes generated by threats such as MITB attacks. Instead of attempting to conceal a detection code, the present invention takes the approach of mutating algorithms to prevent attackers from detecting the existence of the detection code. Several algorithms are used for detection, and any particular browser transaction can contain a variety of mutated forms of the detection algorithms to prevent preplanned subversion of those detection algorithms. This allows for continued and consistent reliability (i.e. on a large scale) of the software's implementation of malware detection.

The present invention reveals the precise nature of attacks, indicates whether an attack has occurred, uncovers the location/destination of stolen information, and reveals potential plans and motives of attackers.

The presently claimed system and method detect the difference between what the browser is presenting to the user and what a server legitimately transmits. Detection occurs via interrogation and algorithmic processing of several environmental variables of the browser, the Document Object Model, and the browser rendering engine. A primary effect of such a system and method is the newly added pressure on attackers requiring expensive adaptation in order to successfully attack multiple targets and on a potentially large scale. A secondary effect of the present invention is the collection and accumulation of active intelligence regarding the nature of the changes and threats in the field, due to actual capturing of the modified content coming from attackers and transmittal of that content for collection and research.

The present invention provides a new layer of integrity for users of high valued websites. The present system and method apply to, e.g., financial institutions experiencing MITB attacks. It is also applicable to non-financial assets which can be similarly attacked. Additionally, the present invention is applicable those high value assets, delivered via HTTPS, which may be vulnerable to browser compromises. Other embodiments of the present invention identify altered or inserted web content on other consumer-oriented web sites.

The present invention allows for the collection of data regarding the evolving threat landscape created by online attackers. The system and method fingerprint user behavior to detect differences between a local user, a remote/foreign user, and an automated script. The system then covertly transmits that information back to the financial institution, by, e.g., impersonating a marketing or user interface optimization firm.

Continued operation requires the following capabilities: (1) a Server with a database; (2) a monthly network connection; and (3) a maintainer, being an entity, person(s), or an organization with an open connection to the server to update detection algorithms, update attack records, and configure attack responses.

The present invention proactively reveals attackers and attack ploys, additionally enabling institutions and security consultants to adapt to revealed attacks in an automated fashion.

The technical components of the present invention comprise: (1) a JavaScript Fingerprinter, for comparison of authentic data with attack-altered data; (2) a Mutator that creates elusive and dynamic defensive code architecture, thus shuffling and randomizing defenses to impede the automation of attacks; (3) a unit for maintaining a facade cover to conceal the system from adversaries; (4) a central database for receiving, processing, and storing of registered and recorded attacks from various clients to selected servers; (5) a unit for continued building of effective defenses against revealed attacks; (6) a unit for encrypting, obfuscating, and concealing activities, even when deterring in-progress attacks; (7) a unit for protection while simultaneously avoiding any disruption of client browsers or browsing activity; (8) a unit for enabling the tracing of attack sources, where possible, and (9) an Application Interface to configure attack logging and responses.

The present system and method mitigate the possibility of failure due to known risks. See the following table (Table 1) for examples of possible inherent risks and the mitigation steps that are employed with regard to each potential risk. Note: "WIV" is used to refer to the presently claimed invention.

TABLE 1

| Possible Inherent Risks | Mitigation Steps |
| --- | --- |
| WIV may be an attractive target for specific attacks or actors | Operate WIV under a cloak of commerce. WIV will appear to be a marketing tool. |
| Network connection may too expensive | Establish servers on a network that can handle high volumes. Charge for WIV usage. |
| Technology may become obsolete, or attacks may change | A maintainer will constantly adapt attack responses, software routines, and the user interface to accommodate known attacks. |
| Attack Complexity may exceed defense capabilities | Register indefensible attacks and recommend that users avoid behaviors and activities that result in the indefensible attacks. |
| Attackers may adapt and make changes we can see | Account agreements will indemnify WIV against liabilities relating to attacks. |
| May not work for unforeseen reasons. A service similar to WIV may have been secretly attempted & failed | Collect and analyze attack data regularly to ensure that operating WIV results in positive benefits relative to costs. |
| Sloppy implementation may allow banks to be attacked through us | Maintain high quality and implementation standards. Conduct regular quality assessments. |
| DOS attacks through WIV could disrupt access to financial institutions | Instruct WIV users to account for and reduce potential risks related to WIV |
| WIV may disrupt browsing activities Attackers may detect WIV | Test WIV in diverse browsers and scenarios Build mutator to ensure that WIV and its security code are a moving target with an obfuscated provenance. Redundantly host WIV to ensure operation even if one instamtiation is detected |
| Institutions may want to hold us liable for attacks that work | WIV is a "best-effort" attempt. Require institutions using the service to indemnify us against liabilities related to use of the service. |

The nature of the user base of the present invention creates an appealing target for online attackers. Because the present system and method protect institutions and users who conduct valuable financial and other transactions, compromising the system would result in critical information leakage. Specifically, an unsophisticated implementation of such would allow Man-In-The-Browser attacks to be effected, even without native code execution, on user desktops. Due to such risks, the present invention has been designed with more care, such that even a fully compromised backend acquires no special ability to compromise financial assets. This is accomplished by separating the infrastructure that delivers the detection capabilities from the infrastructure that receives the environmental data and processes the detection algorithms. A compromise in one does not affect the other.

Web Browsers do not receive "pictures" of the pages they render; they receive a tree of information known as the Document Object Model (DOM). The DOM is populated via HTML and JavaScript, and the DOM interacts with both the legitimate user and the illegitimate MITB attacker. There are many ways to read the DOM (or human-driven events against the DOM), and thus, there are many ways to detect changes inserted by an attacker. These methods include, but are not limited to, detection of variables and characteristics of the D.O.M. that are present when they should not be, are absent when they should be present, or quantify in a manner that is incompatible with the current configuration of the browser and its environment. The present software need only succeed once, whereas an attacker must block each and every one of the detection attempts against him. This is a fundamental inversion of the general threat model in security. Thus, the present invention shifts the burden of adapting to attacks away from institutions and users and onto the attacker.

Only extremely widely deployed malware is detected by AV. Zeus and other MITB systems fragment themselves across many developers; each variant is altering content that AV cannot predict in advance. The present invention negates this advantage by enlisting the actual server of web content, additionally delivering a security code alongside the real software that represents the protected application. Since both the delivered content and the detection mechanism may mutate across sites and across connections, the attacker never knows exactly what is safe to modify or impersonate.

The present invention incentivizes the adversary to become increasingly paranoid regarding which aspects of a web page are allowed to read and monitor other aspects. Such a security model is currently impossible even for defenders to secure; thus, attackers encounter an even greater struggle.

The present invention also incentivizes the adversary to attack the reporting backends, where financial information is stored, or directly emit JavaScript into customer pages, which would be extremely problematic for the attacker, due to higher exposure and increased visibility to detection mechanisms. The security model of the present invention is designed to survive compromise and to, at very least, return to the status quo.

The present invention creates advantages in the defender's role over the position of an attacker. An analysis of the asymmetry between roles is provided below in Table 2 below. This asymmetry exists regardless of the time frame of a given attacker's strategy.

| Assymetry from Different Roles of View | | |
|---|---|---|
| Short-Term Strategies | Attacker: | Attack a system as usual, looking for common behavioral vulnerabilities |
| | Defender: | Invisibly deter and study attacks in an automated fashion |
| | Role Advantage: | Strong Advantage: Defender, Attacker's tools become obsolete/moot |
| Medium-Term Strategies | Attacker: | Continue attacking. Only non-WIV systems are vulnerable to attacks |
| | Defender: | Implement new, creative defenses of attack surfaces using WIV data. |
| | Role Advantage: | Advantage: Defender, Defenders get ahead of attackers at this stage |

-continued

| Assymetry from Different Roles of View | | |
|---|---|---|
| Long-Term Strategies | Attacker: | Attack improper deployments of WIV. Try to attack undetected by WIV |
| | Defender: | Upgrade security creatively. Disseminate WIV security findings |
| | Role Advantage: | Advantage: Defender. Attacks are expensive and are not guaranteed success. Defenses are automated. WIV remains undetected by attackers. WIV behind thwarted attack attempts remains opaque. |

An attack alongside the present invention would be expensive and labor intensive. To illustrate this point, a potential attack strategy, from the viewpoint of a defender, is disclosed here: The attack would involve creating a pair of synchronized browsers and targeting the data back haul from the browsing activity. Browser #1, an impostor, would appear to be the browser actually in use. Browser #2, behind the scenes, would be the browser that is actually active. Browser #2 would provide content over the back haul while Browser #1 would present safe-looking but actually malicious data to the user. Running two simultaneous browsers, both with fully valid behavior but only one with actual network access, is difficult to implement, especially given the lack of knowledge regarding how each browser is tested for validity.

The following examples illustrate the application and benefits of the presently claimed system and method:

Security Consultants and their Clients. A financial institution wants to assess the security of their customer transactions. After deploying the system for as little as one week, a security consultant is able to identify clear opportunities in transaction security and easily identify targets, threats, the general origin of attacks, the amount of relative risk that accompanies each vulnerability, and the most urgent cyber security weaknesses in the institution's transactions. The institution is able to use this information to improve security almost immediately.

Financial institutions. A financial institution is able to use the system to fix extant security vulnerabilities in its customers' transactions. It is also able to use it to identify new vulnerabilities on an ongoing basis and in near-real time. The institution is able to reduce cyber fraud costs by 90% or more, provide better value and security to its customers, and release specific attack data to security consultants to improve the overall cyber security landscape.

Consumers. Consumers benefit from the system without needing to realize it exists. As the cyber security of financial institutions improves demonstrably, consumers feel more confident in their online transactions and activities. Consumers benefit from an increased presence of cyber security, increasing their online activities as a result.

Online Merchants. As consumers and financial institutions increase their cyber security and online confidence, online merchant sales increase.

Cyber Law Enforcers (i.e., a "Cyber Fraud Squad"). The present invention dramatically improves the process of tracking sources of online fraud. The system and method specifically observe and collect data from activities across an extremely vulnerable attack surface: the consumer (financial) transaction point. The collectible data strongly increases the ability of a cyber law enforcement team to trace, prosecute, and deter attacks in the U.S. and abroad.

With the presently disclosed software and method, at least all of the following are possible:

The claimed system and method can determine the whether a web browser is active, based on what files are present on the same system as that web browser. The existence of these values is available via JavaScript access, and determinations can be made by detecting differences from default configurations of these browser values.

The following embodiment gives an example of how the above information is obtained: An active probing model is employed for the collection of qualitative metrics evaluating activity over a computer network. Through this active probing model, a much deeper reservoir of differentials between types of activity (i.e., browser activity) can be implemented (compared to the differentials used in the current state of the art). This method actively loads additional code and sends additional content on the wire to different and new locations ("active probing"). JavaScript (JS) and Flash, for example, can be actively probed in order to detect automated/fraudulent activity and assemble a report based on qualitative performance metrics. It assumes that legitimate human users, by in large, have JavaScript and other active scripting technologies, including but not limited to Flash, enabled and are using full web browsers. As such, an attacker will fail to execute any queries that are at all dependent on JavaScript. The trap set for potential attackers is that, in evading this exceedingly reliable detection mechanism, they must now actually emulate all parts of the browser. And because a real JavaScript environment—as well as other scripting technologies—has an infinite amount of properties that may be probed, the attacker must emulate every property potentially probed. Thus, previously unnoticed information and resulting discrepancies become exposed. For example, when a mouse event is falsified, one timestamp associated with that event may become absent; an auxiliary field may be set to a unique and incorrect value; or a mouse event rate is too stable or too unstable. The process with regard to a single given metric can be generally plotted out by the following steps: (1) obtain differential; (2) measure in client system (or first server, analysis server), under amplified circumstances if necessary; (3) send to reporting server (or second server), obfuscated if possible; and (4) attach finding to session identifier, thus creating a user interaction data unit, where a compilation of user data units makes up a report.

The process with regard to a single given metric can be generally plotted out by the following steps: (1) obtain differential; (2) measure in client system (or first server, analysis server), under amplified circumstances if necessary; (3) send to reporting server (or second server), obfuscated if possible; and (4) attach finding to session identifier, thus creating a user interaction data unit, where a compilation of user data units makes up a report.

Before the process of differentiation begins, an individualized code snippet must be inserted into the HTML code of a given web page. When this code snippet is present in the code of a given web page and that page is accessed, performance metrics are sent to remote analysis servers via asynchronous HTTP posts. These metrics evaluate the behavior and performance of the entity that viewed or is viewing the given web page, and how that page was loaded. The code snippet is injected as JavaScript alongside an advertisement or other script load event. As the Internet is comprised of many such loads (or injections), this invention creates merely one more. For example, a performance metric based on a mouse event can be collected in the following manner: (1) Handlers and listeners are registered for a mouse event; (2) The handler receives the various timestamps and values associated with the mouse event; (3) The system then emits the raw timestamps and values, or a summary thereof, over the network. If no listener is registered, it would be impossible to recover this data from the ambient traffic.

Performance metrics for various visitors to a given web page containing the code snippet, as well as those for all web pages containing similar code snippets, are compiled and aggregated by the remote analysis servers into reportable metrics, which in turn are made available to the operator of a given web page in a number of reporting mediums, including, but not limited to, password protected interactive HTML dashboards, exportable spreadsheet documents, and subscription based email and PDF reports, and may be used in real time to control access to a given web page.

Some examples of properties that can be probed include but are not limited to (note: this particular embodiment focuses on detecting automated activity): (1) the precise relationship of mouse events seen on a page (e.g., a click associated with a mouse-up or mouse-down movement, agreement between the two timestamps associated with each mouse event, as discussed above, etc.); (2) the rate that Flash is updated (e.g., per second) and the reliability of its calls; (3) operation of Flash stages in all locations of operation operating in sync); and (4) the speed of completing a graphical update (e.g. to a <CANVAS> element), which might indicate the type of hardware used or the active updating of a real user screen. It is possible to differentiate malicious automated agents/attackers from humans by gathering and processing elements of a given user's interaction with a web page that occurs after a web page has been loaded by the user, and comparing those elements to reference results drawn from a control group. This is achieved in part by placing certain elements within the code of a web page prior to it being loaded by a given user, so that those elements may be evaluated after that user has loaded that web page.

The elements monitored and evaluated fall into two main classes of data: (1) content that exists (or is absent, i.e. does not exist) at page load, and (2) content that is generated over time (or timing) as the page persists in potentially usable form (See Para. 43). Content that exists at page load encompasses bits, or parts of code, which are accessible or visible even though they should not be. This content consists of JavaScript ("DOM") elements which exist (or do not exist) due to the manner in which the browser is hosted. For example, if loaded by a human user, some bits would be inaccessible for security or other reasons; however, if loaded by an attacker, the same bits would be accessible). For another example, attackers also constantly and actively inject specific configurations in manners that are different from the behavior of the browser or the site being monitored. In general, aspects of a shell (e.g. Internet Explorer, Firefox, Safari, Chrome) are exposed to the JavaScript environment in an engine (e.g. Trident, Gecko, Webkit), and, e.g. automated agents/bots, being shells themselves, either expose too much information or too little information, and the discrepancies are captured by the active probing model. These captured characteristics include, but are not limited to, HTML5 standards compliance, patterns in error handling (including information about what language the errors are translated into), and browser elements injected by the browser shell rather than the native object (different objects are injected or not injected based on the host, which could be, e.g., Internet Explorer or an automated agent/attacker framework).

Second, the claimed system and method allow for use of unintended (i.e. otherwise unused) features of web browsers, particularly the timing of operations that are able to access local resources, to identify present files. These environmental variables and timing measurements are available via JavaScript access in the browser. The timing measurements are indicative of the presence of particular local resources, determined via historical measurements and analysis.

The following embodiment, continued from Paras. 37-43, gives an example of how the above information is obtained: Unintended/unused features comprise both the first class (see discussion above) as well as a second class of data—content that is generated over time (or "timing information"), generally refers to elements that vary due to interaction with a human user. These might be events that take incorrect amounts of time, relative to one another, because there is no actual human for whom the events are being performed. Timing attacks work against more than just cryptographic systems. It is often faster, but sometimes much slower, to express the result of a browser operation (of which there are hundreds of thousands) when there is no screen to update and no user to inform. For example, error messages can be suppressed, or the graphics hardware might notice that no pixels require update. By measuring absolute and relative timing differentials, attackers expose themselves to the present invention. Tests are generated on the infinite number of such differentials, hosted quite infrequently (since the purpose of automated agents/attackers is to operate at scale, this does not have to occur often), and thus an attacking developer faces the obstacle of forging credentials he does not necessarily know in advance. This second class of metrics comprises (note: this particular embodiment is geared towards detecting automated activity): mouse activity (where the mouse is located, number of updates per second, geometry of mouse movement, ancillary data to mouse event data—i.e. the metadata associated with a mouse click, scroll up, scroll down, or scroll over, the correlation between mouse events, etc.), missing data when an event is incorrectly synthesized, keyboard activity, accelerometer data, scroll events, average read and visit time, page update rate (animation rate has a strong correlation with visibility of a page), and supported network protocols and web standards (bots programmed by attackers can break communication pathways).

It is additionally noted that both classes of performance metrics discussed in the embodiment above force a given system to follow code paths which differ depending on whether the browser interaction is automated or human Timing measurement data is detectable and differentiable because operations still complete but take longer or shorter, depending on the type of user. There is also potential for overlap between the classes of performance metrics/data. For example, a different security check may fail (or not fail) under automation, yielding the same reaction to a client code, just 10% slower. Additionally, repeating the test many times allows for even very small timing differentials to be amplified to the point of reliable distinguishing ability.

These metrics are evaluated in such a way by the remote analysis servers that the information presented to the operator of a given web page that has included a code snippet is presented with a qualitative evaluation of whether or not a given visit to that web page was or was not made by an automated agent. This process of evaluation entails the following: the code snippet sends "emit events" from various "plugins". These emissions (i.e. "emit events") are sent via a variety of network channels, not all of which are always available. The present channels used are <img> tags, XMLHTTPRequests with CORS (Cross Origin Resource Sharing), and IFrame Form Post events. Initially, IFrame Form Posts are used, since they are the most compatible. Secondly, if CORS is compatible, the system can be upgraded to CORS. Other channels include WebSockets and Same Domain XMLHTTPRequest (which requires use of a local iframe that is configured to speak cross domain, through a toolkit like EasyXDM).

The computational process required to determine the above performance metrics and ultimately evaluate a visitor or transaction can be implemented either via batch processing or via stream processing. Batch processing can be more efficient and can collate metrics across several events. Stream processing can scale better than batch processing but it cannot, for example, use future data to inform past impressions of normality (because, at the time of decision, the future event has not yet occurred). With stream processing, near-real time evaluation of a given user can be achieved. Thus, although normality metrics are determined by the past only, stream processing allows for the use of transaction identifiers embedded in a particular measurement event to evaluate, within thirty seconds of the last time of a given user's interaction, whether or not that user was, e.g., a bot or a human.

Third, the claimed system and method allow for use of a webcam during web site use to authenticate the presence of a real user, perhaps requiring the user to state the nature of a transaction as a human verifiable signature, or alternatively using face recognition to disable account access when the user is not present at the computer. This is accomplished via a user interface embedded in the web application that presents a statement to be read by the user, allows for access to the web camera, and streams a video clip of a user stating authorization for the transaction to the server hosting the web application. Alternate architectures include, but are not limited to, a Software as a Service infrastructure to receive and verify the authenticity of these videos via cryptographically signed session identification numbers with embedded timing values for comparison to time of video capture. The presently claimed system ensures the validity of such a transaction.

Fourth, the claimed system and method also allow a financial institution, wishing to validate transactions of highly mobile customers, to send messages to user devices which can validate the user's location via a code installed on the client device. Privacy is potentially maintained via challenges/prompts (e.g., "Are you really in Vancouver?") and logs (e.g., "We checked your location at this time in response to your transaction, #X. Click here to be warned every time we check."). This is accomplished using the remote detection decisions of the detection algorithms to verify the reported location of the device from which the transaction originated.

The present system and method comprise the following elements (and sub-elements) (See FIG. 1):

Continuous and concurrent processing by server 11, comprising a fingerprinter 111, a mutator 112, and defensive mechanisms 113, wherein:
  (1) The mutator 112, acting to shuffle and randomize defenses, comprises:
    (a) a dynamic and elusive mutator code architecture 201, comprising:
      I) mutator code,
      II) mutator data encryption processes, and
      III) anti-debugging, anti-tampering, and/or proof of work code; and
    (b) mutator functional specifications 202.

(2) The fingerprinter 111, acting to detect differences between a local user, a remote/foreign user, and an automated script, comprises:
  (a) Software 101 for the fingerprinter (i.e. fingerprinter architecture), comprising:
    I) fingerprinter code, and
    II) fingerprinter data encryption processes; and
  (b) JavaScript fingerprinter functional specifications 102.
(3) The defensive mechanisms 113 comprise:
  (a) defensive algorithms 301,
  (b) encryption and obfuscating methodologies 302,
  (c) attack tracing methodologies 303, and
  (d) Defensive Design Characteristics 304.

The above elements are further detailed below:

Mutator code. The mutator is configured to take source code as input, parse it into an intermediate form, transform it according to a set of mutator functional specifications (described below), and apply any security-auditing, anti-debugging and anti-tampering code developed. The imitator then outputs source code parseable by the browser which is functionally equivalent to the input source code but significantly harder to understand.

The order of inserting security checks and mutators is not fixed.

The mutations are such that any subset of all the mutations can be applied at any given time, and the mutations applied can change according to specific configurations.

The mutations are also polymorphic, i.e., the mutator can take a seed value such that providing a different seed value will produce different code.

Mutator data encryption processes. The input source code will generate data for the backend analysis to consume, and the integrity of the backend analysis depends on the data provided; thus, the mutator is required to make it difficult to tamper with the data being transmitted to the database of the presently claimed system. As such, the mutator modifies the data sending code in the input source code to automatically encrypt and authenticate the data it sends back. It may also modify the data transport encoding outside the encryption algorithm and key used to further complicate an adversary's attempts to understand or modify the data.

Anti-debugging, anti-tampering, and/or proof of work code. In addition to mutating the code, the mutator can insert anti-debugging, anti-tampering, and/or proof of work code in intertwined locations within the source code to make the code harder to reverse-engineer and/or bypass. The mutator can insert checks for JavaScript debuggers, checks to test its own integrity, proof of work checks to ensure code has run, etc., thus making it more difficult to perform manual and automated analysis of the code and to frustrate attempts to modify or hook the code sent by the presently claimed system in order to bypass the checks.

Mutator functional specifications. The mutator functional specifications include the following: (1) Renaming all variables to randomly chosen names, either from a chosen character space, a dictionary list, or a combination thereof; (2) Reordering statements and functions without violating data flow constraints, including inlining, outlining, and code hoisting outside of loops and function boundaries; (3) Inserting extra computations, opaque predicates, extra control and data flow; (4) Encrypting code server-side, and decrypting code at runtime; (5) Replacing direct variable access with enumeration and computed hash comparisons; (6) Replacing single event listeners with code inside a personal global event dispatcher; (7) Binding encryption routines to expected environment such as URLs and browser settings/implementation details; (8) Converting constants into computations that can be moved around the code; (9) Converting variable access into virtual pointer accesses into a memory array; (10) Converting source computations into a custom-written bytecode, with a browser-executable interpreter; (11) Using different encryption/decryption keys/functions for different parts of the code that must be requested at runtime from a backend server; and (12) Moving computations out of scripting languages into computations performed by the rendering engine in the course of evaluating mark-up.

Fingerprinter code. The fingerprinter code is embodied by an algorithm that receives the environmental variables specified above and outputs a decision on whether the user is remote, foreign, and/or automated.

Fingerprinter data encryption processes. These processes are also embodied by code employing a data encryption process, where information provided by the client software is signed, authenticated, and/or scrambled such that the authenticity of the data is provable, and such that the data is received by the server uncorrupted and without allowing third parties the ability to understand it.

JavaScript fingerprinter functional specifications. Certain inputs to the user/client software can cause the client software to exhibit different behaviors, which are signifiers as to whether the client software is being used by a local human, a remote human, or an automated script. Such signifiers include, but are not limited to, the mismatch between claimed and detected software versions, information about the visual environment being displayed to the user, information on the patterns of user input, and other environment variables such as timing, the availability of resources, and the ability to use functions normally not available.

Defensive algorithms. A requirement that identifiers are globally unique, and time ordered, with a cryptographic signature (HMAC) so that it can be determined that behavior and environment information is neither a forgery nor a replay of previous information.

Encryption and obfuscating methodologies. These methods include randomly mutating the representation of the code provided to the client, required to run the software and collect the behavior and environmental information necessary for determining the fingerprint, such that identifiers are changed to use meaningless names, and the logic structure is changed such that the order of operations is randomized.

Attack tracing methodologies. The code disallows common debugging and tracing techniques by turning off debug functionality in the client software as well as interfering with resources that are commonly used by debuggers and tracing software.

Other embodiments of the present invention further comprise: a central database 12, a maintainer application interface 13, and a marketing or user interface façade 14.

The interface façade 14 comprises set themes for:
  (a) Variable & DNS names 141. Each customer has a set of parameters that describe both which customer they are, and what metadata is associated with the transaction in question. DNS names may be used as a mechanism for transmitting specific parameter subsets. The advantage of DNS over HTTP parameters is the ability to actively disable swaths of traffic that may otherwise overload servers. As opposed to receiving an initial query and null-responding it, DNS may simply return a null response cutting all further communication—with configurable time for null routing via the DNS TTL mechanism; and (b) An "online marketing data collection tool" 142. The presently claimed system collects various datasets that it may then render to a client via online analytical toolkits; and (c) External elements 143 of the façade (where required). For example, an interface may be specifically themed to declare it is rendering data for a particular customer.

The maintainer/application interface 13 comprises: a configuration engine for an operator that controls interactive 131 and non-interactive 132 (i.e., feedback to a customer API) interfacing with collected data. interactive interfacing 131 may include theming, operational parameters, defaults, etc. Non-interactive interfacing 132 may include the format (XML or JSON) and transport protocol (REST HTTP or SOAP or SNMP Traps) for real-time feeds of data. This application programming interface is used for remote and local access and modification of data, algorithms, processes, and configuration of the detection software.

A distribution process for institutional deployment of the presently claimed system and method comprises configuration and delivery of a JavaScript code snippet added either directly to a web page, embedded in a web asset (such as an advertisement, web applet, widget, iFrame, image, or video), delivered via a browser plugin or extension, or delivered via packet injection into a TCP stream.

Furthermore, the present invention splits the hosting of static content (i.e., JavaScript executed in the context of the protected application) with the reception of telemetry (i.e., "postbacks" that expose whether or not there are security violations on the client machine). This allows a significant degree of protection in which even if the system's receiving server is compromised, it does not necessarily start hosting malicious JavaScript to clients (because that comprises a separate hosting system). This secures the server and allows for redundant hosting of the presently claimed system.

The presently claimed system and method were further tested, debugged, and security-audited via the following steps:

1) Commission legal T&C to indemnify WW against user & client liabilities;
2) Dark Testing of Client Browsers;
3) Test system on browsers (on internal servers, not across the Web);
4) Debugging & security review of browser integration & integrated components;
5) Test system deployment from example institution;
6) Debugging and security review of institutional deployment;
7) Final debugging and security review of integrated components to date;
8) Run the system (live across the Web);
9) Test institutional deployment, client installation, and server/db activities;
10) Final debugging and security assessment.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A computer-implemented method for network security and integrity validation. comprising the steps of:
   detecting, within a computer network, at least one codepath difference between a local user, a remote/foreign user, and an automated script, wherein said detecting is performed by a fingerprinter, said fingerprinter being configured to emit a source code to measure a manner in which a function is run within a browser,
   transforming a source code emitted from said fingerprinter, wherein said transforming is performed by a mutator, said mutator being configured to send the same detection a plurality of times more in a mutated yet functionally equivalent form to require an attacker to emulate a same human action for each such transformation, said transformation being undetectable by a human user,
   and employing defensive mechanisms for security-auditing,
   wherein said detecting, transforming, and employing of defensive algorithms occurs concurrently and continuously,
   thus enabling the collection of information regarding a browsing user.

2. The method of claim 1, further comprising:
   collecting said information regarding the browsing user in a central database,
   processing said collected information via a maintainer application interface, and
   corresponding, via a user interface façade, with a specific browsing user to validate said user's integrity if a security threat is detected.

3. The method of claim 2, wherein said user interface façade comprises variable themes.

4. The method of claim 2, wherein said security threat is a "Man-in-the-Browser" attack.

5. The method of claim 1, further comprising randomizing defenses, which is performed by the mutator.

6. The method of claim 1, wherein said defensive mechanisms further comprise defensive algorithms, encryption and obfuscating methodologies, attack tracing methodologies, and defensive design characteristics.

7. The method of claim 1, wherein said transforming of source code is polymorphic.

8. The method of claim 1, wherein said mutator additionally inserts anti-debugging, anti-tampering, and/or proof of work code in intertwined locations within the source code.

9. The method of claim 1, wherein said at least one codepath difference is signified by the following: a mismatch between claimed and detected software versions, information about the visual environment being displayed to the user, information on the patterns of user input, timing, an availability of resources, and an ability to use functions normally not available.

10. The method of claim 1, wherein said mutator is configured to reorder statements and functions without violating data flow constraints.

11. The method of claim 1, wherein said imitator is configured to replace direct variable access with enumeration and computed hash comparisons.

12. The method of claim 1, wherein said mutator is configured to replace single event listeners with code inside a personal global event dispatcher.

13. The method of claim 1, wherein said imitator is configured to bind encryption routines to an expected environment.

14. The method of claim 1, wherein said mutator is configured to convert constants into computations, wherein said computations are moved within the code.

15. The method of claim 1, wherein said mutator is configured to convert variable access into a memory array.

16. The method of claim 1, wherein said imitator is configured to convert source computations into a custom-written bytecode.

17. The method of claim 1, wherein the mutator is configured to move computations out of scripting languages into computations performed by a rendering engine in the course of evaluating markup.

18. The method of claim 1, wherein the mutator is configured to use a first encryption key for a first part of a code, and a second encryption key for a second part of the code, said first and second keys being requested at runtime from a backend server.

19. The method of claim 1, wherein the defensive algorithms are configured to require a unique identifier with a cryptographic signature for each transformation.

20. A computer implemented system for validating a secure computer network, comprising a computing device including a processor that is coupled to a computer memory and a server, wherein the system performs the steps of:
    detecting, within a computer network, at least one code-path difference between a local user, a remote/foreign user, and an automated script, wherein said detecting is performed by a fingerprinter, said fingerprinter being configured to emit a source code to measure a manner in which a function is run within a browser,
    transforming a source code emitted from said fingerprinter, wherein said transforming is performed by a mutator, said mutator being configured to send the same detection a plurality of times more in a mutated yet functionally equivalent form to require an attacker to emulate a same human action for each such transformation, said transformation being undetectable by a human user,
    and employing defensive mechanisms for security-auditing,
    wherein said detecting, transforming, and employing of defensive algorithms occurs concurrently and continuously.

* * * * *